C. FREIHOFER.
VEHICLE SPRING.
APPLICATION FILED MAY 10, 1920.
1,387,375.
Patented Aug. 9, 1921.
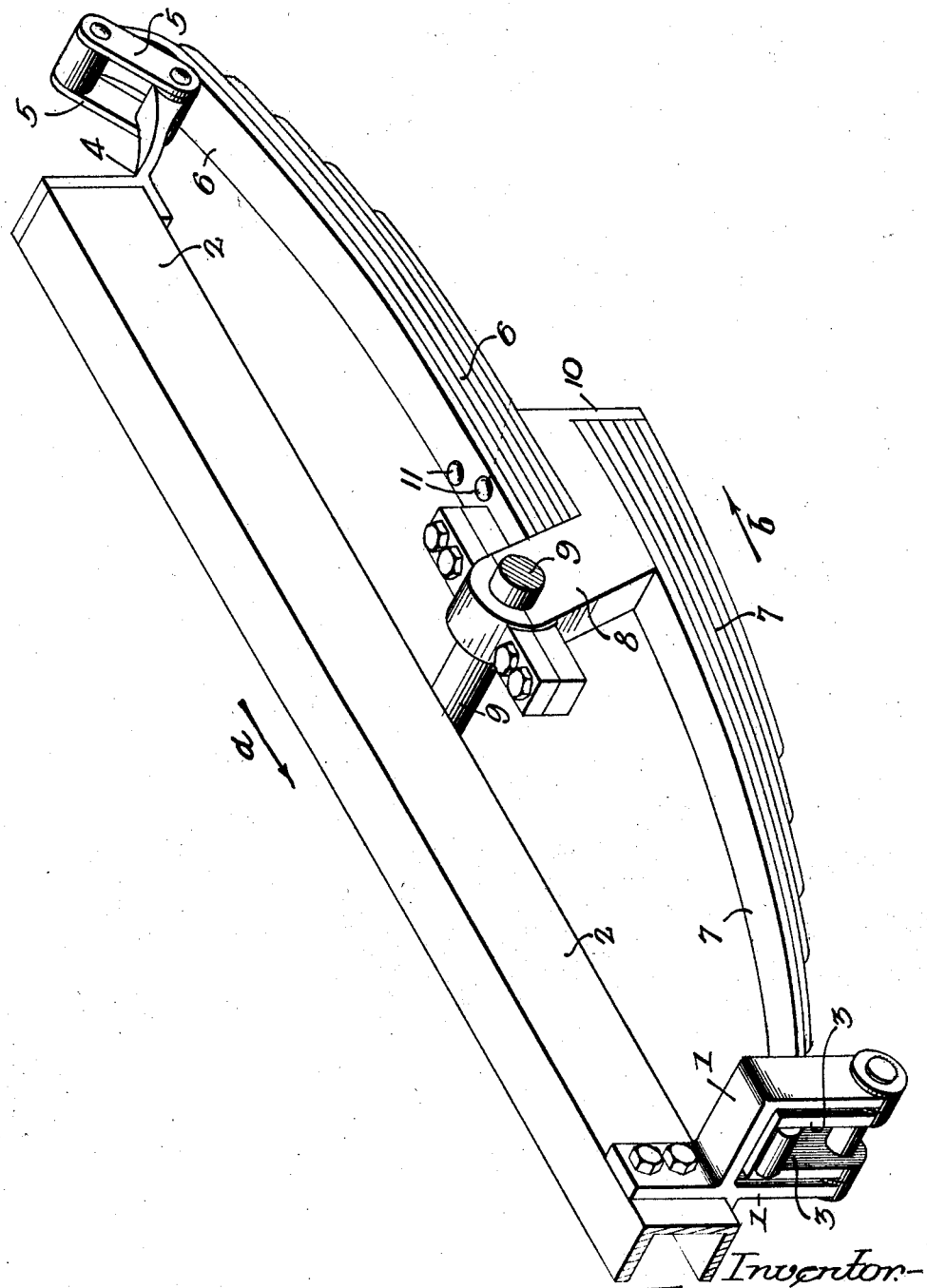
Inventor:-
Charles Freihofer.
by his Attorneys-
Howson & Howson

UNITED STATES PATENT OFFICE.

CHARLES FREIHOFER, OF PHILADELPHIA, PENNSYLVANIA.

VEHICLE-SPRING.

1,387,375.	Specification of Letters Patent.	Patented Aug. 9, 1921.

Application filed May 10, 1920. Serial No. 380,138.

*To all whom it may concern:*

Be it known that I, CHARLES FREIHOFER, a citizen of the United States, residing in Philadelphia, Pennsylvania, have invented Vehicle-Springs, of which the following is a specification.

One object of this invention is to provide a novel form of resilient connection between the axles and frame or body of a vehicle, especially designed to diminish the jars or shocks to such body caused by poor roads or by the passage of the wheels of the vehicle over obstructions, etc.

Another object of the invention is to provide a spring of novel form and construction, together with a novel arrangement of connections for mounting it between the axle and the frame of a vehicle with a view to causing the latter to ride easily over rough roads.

These objects and other advantageous ends I attain as hereinafter set forth, reference being had to the accompanying drawings, in which, The figure is a perspective view illustrating the preferred form of my invention.

In the above drawings 2 represents a portion of one of the side frames of a vehicle, the end portion of one of whose axles is indicated at 9. Rigidly fixed to the frame member 2,—in the present case at one end, is a projecting bracket 4 to which are pivotally connected a pair of parallel links 5. A second bracket 1 having a downwardly extending fork portion, preferably having an inverted U-shape, is rigidly fixed as by bolts to the frame member 2 about the same distance in front of the axle 9 as the latter is in front of the bracket 4 and this second bracket 1 has pivotally connected between its arms or side members a pair of links 3 which may be formed as a single U-shaped structure.

The latter extends upwardly from its pivot between the side members of the bracket 1 and has pivoted to it adjacent its top one end of the long upper member of a quarter elliptic leaf spring 7. The thick end of this spring is riveted or bolted to an axle engaging member 8 in the form of an angular casting or forging whose two members extend at an obtuse angle to each other. The upper end of the upwardly extending portion of this member 8 is journaled on the axle 9 and the thick portion of the leaf spring 7 engages or lies against its flat bottom face, abutting upon an integral downwardly extended flange 10 projecting from the end of the bottom portion of said member.

A second quarter elliptic spring 6 has its thick end resting upon and rigidly connected to the angular axle engaging member 8, from which it extends rearwardly toward and beyond the bracket 4; its longest leaf member being extended upwardly and pivoted to the upwardly extending free ends of the links 5. While as above noted the thick part of the spring 7 lies under and parallel with the bottom portion of the axle engaging member 8, the thick portion of the spring 6 rests upon the upper face of this same bottom portion, so that the same bolts or rivets 11 may be utilized to connect it to said member and to the spring 7. It is noted that the parts are so proportioned that the links 5 extend upwardly and rearwardly from the point of their pivotal connection with the bracket 4, while the links 3 likewise extend upwardly from the pivot which connects them to the bracket 1, to their pivotal connection with the end of the spring 7.

With such construction, the striking of an obstruction by the wheels or their sudden drop into a hole or rut while the vehicle is moving in the direction of the arrow $a$, acts to cause the axle with the spring members 6 and 7 to approach the frame or body of the vehicle and at the same time imparts to them a movement or tendency to move, in the direction of the arrow $b$. The links 3 thereupon tend to swing on their pivot in a clockwise direction while the links 5 tend to swing on the pivot connecting them to the spring, also in a clockwise direction. To this action and to the arrangement of the springs 6 and 7, a shock or jar is more effectually dissipated or its effect diminished, than would be the case if the springs 6 and 7 were combined as a single semi-elliptic spring connected to the frame member 2 in the customary manner. The deadening of the shock or jar is further insured by mounting the thick ends of the springs 6 and 7 one above the other as illustrated, their connection to the member 8 being simplified by reason of the necessity for but a single set of bolts 11.

I claim:—

1. A vehicle spring consisting of an axle-engaging member and two quarter elliptic springs having their thicker portions connected one above the other to said member and extending in opposite directions therefrom.

2. The combination of an angular member having one arm formed to engage an axle; with two quarter elliptic springs connected respectively on the upper and lower sides of a second arm of said member and extending in opposite directions therefrom.

3. The combination of a member having two arms at an obtuse angle to each other, one of said arms being formed to rotatably engage an axle; two quarter elliptic leaf springs mounted respectively adjacent the upper and lower faces of a second arm of said member; with common means connecting said springs to said other member.

4. The combination with the frame and axle of a vehicle of two brackets connected to said frame; a pair of links pivotally connected to one of said brackets and extending upwardly from its pivot; a second pair of links pivotally connected to the second bracket and also extending upwardly from their pivot; a member rotatably engaging the axle; and resilient elements pivotally connected to the two pairs of links respectively and rigidly connected to said axle engaging member with their thick ends one above the other.

5. The combination with the frame and axle of a vehicle of two brackets connected thereto; a pair of links pivotally connected to and extending upwardly from said brackets respectively; an angular member having one arm journaled on the axle; and two leaf springs having their thicker ends fixed one above the other to a second arm of said axle engaging member with their thinner ends respectively pivoted to the pairs of links.

6. The combination with the frame and axle of a vehicle, of a member having two arms at an obtuse angle and having one of its arms journaled on the axle; two leaf springs having their thicker ends respectively fixed to the outer faces of a second arm of said member; and means for movably connecting the thinner ends of said spring with the frame.

7. The combination with the frame and axle of a vehicle, of a member having two arms of which one is journaled on the axle and extends at an obtuse angle to the other; two leaf springs having their thicker ends respectively fixed to the outer faces of the second arm of said member; and means for movably connecting the thinner ends of said springs with the frame, consisting of a pair of brackets extending downwardly from said frame, and two pairs of links respectively connecting the brackets with the thinner ends of the springs.

8. The combination with the frame and axle of a vehicle of a member rotatably engaging the axle; oppositely extending resilient elements rigidly connected to said axle-engaging member with their thick ends one above the other; and means including links connecting the thin ends of said resilient elements to the frame.

CHARLES FREIHOFER.